United States Patent [19]
Kishi

[11] Patent Number: 5,357,880
[45] Date of Patent: Oct. 25, 1994

[54] RAW SEWAGE DISPOSAL APPARATUS

[75] Inventor: Mitsuhiro Kishi, Ashikaga, Japan

[73] Assignee: Japanic Corporation, Tochigi, Japan

[21] Appl. No.: 158,747

[22] Filed: Nov. 22, 1993

[30] Foreign Application Priority Data

Jan. 28, 1993 [JP] Japan .................. 5-031170

[51] Int. Cl.5 .................... F23G 7/04; A47K 11/02
[52] U.S. Cl. ...................... 110/238; 110/216; 4/111.1; 34/95
[58] Field of Search .............. 110/238, 216; 34/95; 4/111.1

[56] References Cited

U.S. PATENT DOCUMENTS

| | | | |
|---|---|---|---|
| 3,903,813 | 9/1975 | Pan | 110/238 |
| 4,999,930 | 3/1991 | Kishi et al. | 34/95 |
| 5,058,213 | 10/1991 | Kishi et al. | 34/95 |
| 5,152,074 | 10/1992 | Kishi | 34/1 B |
| 5,156,098 | 10/1992 | Camp | 110/238 |
| 5,230,164 | 7/1993 | Kishi | 34/95 |
| 5,257,466 | 11/1993 | Kishi | 34/95 |
| 5,261,126 | 11/1993 | Kishi | 110/216 |
| 5,265,544 | 11/1993 | Bigelow et al. | 110/238 |

Primary Examiner—Henry C. Yuen
Attorney, Agent, or Firm—Flynn, Thiel, Boutell & Tanis

[57] ABSTRACT

A raw sewage disposal apparatus for use in a temporary toilet capable of continuously drying a large amount of raw sewage. The raw sewage disposal apparatus comprising an incinerator shielded from the outside, a swing shaft rotatably horizontally supported by the incinerator, a drying cauldron which is hollow at the inside thereof and fixed to the swing shaft, an introduction port which is defined on the peripheral surface of the drying cauldron for introducing raw sewage in the drying cauldron, a plurality of spherical stirring balls which are accommodated in the drying cauldron, and a burner communicating with the lower portion of the incinerator for jetting flame toward the bottom surface of the drying cauldron.

19 Claims, 8 Drawing Sheets

RAW SEWAGE DISPOSAL APPARATUS

FIELD OF THE INVENTION

The present invention relates to a raw sewage disposal apparatus for disposing raw sewage quickly and temporarily at an outdoor location having no purification facility, and particularly to a raw sewage disposal apparatus capable of continuously evaporating and drying a large amount of raw sewage and also capable of cleaning dust which remains after the drying disposal of the raw sewage.

BACKGROUND OF THE INVENTION

The raw sewage discharged from human bodies is typically discharged into a sewage system by use of a flush toilet or the like and then flows into a river after being temporarily contained in a holding tank and purified therein. However, at events such as festivals, athletic events, fairs, meetings and the like, temporary toilet facilities must be provided for disposal of raw human waste. In case of the collapse of houses due to fire, earthquake, typhoon, a temporary toilet is installed in the fire location, disaster place, etc., for preventing disease from generating.

Employed conventionally are movable temporary toilets, most of which have a tank for temporarily storing the raw sewage therein. However, the temporary toilets have the problem that the raw sewage contained in the tank must be sucked into a vacuum truck for collection and the collected raw sewage must be transferred to a raw sewage disposal purifying facility, which is laborious and time consuming and is unhygienic.

Transportation vehicles, such as buses, trains, vessels, etc., which operate over long distance are provided with a tank exclusively used for storing and holding discharged raw sewage. The raw sewage in this tank is subjected to a deodorizing treatment by chemicals and thereafter is collected by a vacuum truck at a terminal or relaying point.

As mentioned above, the raw sewage in conventional temporary toilets or movable transportation facilities is contained as it is discharged from the human body and is collected thereafter. Accordingly, the storing method, the collection method and the disposal method are not modern and are very unhygienic. Accordingly, if the temporary toilet has been used for a long period of time, the discharged raw sewage remains in the tank, which cause a bad smell. Furthermore, since operators dislike disposing of the raw sewage, it is not preferable in view of modernization of maintenance of the temporary toilet.

In an attempt to ameliorate the above problems, there have been proposed several hygienic disposal methods. In one method, for example, chemicals are introduced into the tank where the raw sewage is contained to thereby prevent the bad smell and to effect sterilization of the sewage. This method, however, cannot be used for a long period of time because the chemicals become diluted and costs are high though it is often employed in transportation vehicles.

In another method, the raw sewage is contained in a bag made of vinyl and the like to prevent the diffusion of the bad smell. This method, however, requires a vinyl bag of large size and involves a high cost for disposal thereof, and it is troublesome to separate the raw sewage from the bag. A large scale disposal facility is also required.

In still another method, the discharged raw sewage is directly dried by use of heat from a burner, etc. Since the primary component of raw sewage is a liquid component, a large amount of heat energy is required to remove the liquid component and it takes a long time to effect one time disposal of the raw sewage.

In view of the drawbacks of the conventional methods of disposing of the raw sewage, the present inventor proposed a disposing apparatus having a casing provided with stirring blades and heat holding bodies therein in which the raw sewage is stirred by the rotation of the stirring blades and heated by heat generated by the heat holding bodies whereby the raw sewage is dried in a short period of time and the liquid component which is the primary component of raw sewage is evaporated as disclosed in Japanese Patent Nos. 63-124150, 2-411577, and U.S. Pat. Nos. 4,999,930, 5,058,213, 5,152,074, 5,230,164, 5,257,466, and U.S. patent application Ser. Nos. 07/809 962 filed Dec. 18, 1991 and 07/985 556, filed Dec. 3, 1992, now U.S. Pat. No. 5,261,126.

According to the proposed disposal methods, the raw sewage is heated, evaporated in a casing and diffused into the ambient atmosphere. Before the liquid component is diffused, the components which cause bad smell are resolved by a catalyst so that the liquid water is diffused into the atmosphere as an odorless vapor. It was preferable to employ such a method in view of environmental hygiene and preservation even if such method is employed in crowed buildings and/or by throngs of people.

It is very hygienic to evaporate and stir the raw sewage contained in the airtight tank and such operations can be carried out systematically, which results in not causing a burden to the operators. In the raw sewage disposal apparatus proposed by the inventor of this application, raw sewage is contained in an airtight container (drying cauldron) and the low portion of the airtight container is heated by a heater, etc. to thereby facilitate the evaporation function. Since the liquid component of the raw sewage is evaporated and the raw sewage is dried in such an airtight container, bad smell is not dispersed outside the apparatus, which contributes to the hygienic disposal of the raw sewage. The bad smell component among the evaporated liquid component is oxidized by being forced to contact a catalyst so that the evaporated liquid component can be discharged to the atmosphere with an odorless state. As evident from this, the proposed apparatus is to provide a hygienic disposal structure different from the conventional privy type temporary toilet.

However, in a mechanism for storing raw sewage in the tank and for drying the raw sewage by a stirring blade and heating balls, there is a problem that a large amount of raw sewage cannot be continuously dried since the amount of raw sewage to be disposed of at one time is restricted. Furthermore, there remains in the drying cauldron fibrous substances, ash, etc. among the discharged raw sewage which cannot be evaporated.

If much dust accumulates in the drying cauldron, there is a problem that the heat transmission deteriorates and the stirring blade does not rotate, which impedes the normal drying process. Accordingly, there is required a cleaning process for removing the dust upon completion of the drying process. In a prior art arrangement, since the drying cauldron is fixed, compressed air is supplied to the drying cauldron by a blower, etc. so that the dust in the drying cauldron is forcibly dispelled. According to this method, it is easy to dispel fine dust but additional apparatus such as the blower is required, which makes the mechanism complex. Furthermore, a large lump of dust cannot be dispelled by the compressed air but remains in the drying cauldron so that a complete cleaning cannot be performed. Accordingly, it is desired to attain a mechanism capable of continuously drying and evaporating the raw sewage and also capable of easily removing the dust remaining in the drying cauldron upon completion of the drying process.

It is thus an object of the invention to provide a raw sewage disposal apparatus comprising an incinerator shielded from the outside, a swing shaft rotatably horizontally supported by the incinerator, a drying cauldron fixed to the swing shaft, an introduction port which is defined on the peripheral surface of the drying cauldron for introducing raw sewage in the drying cauldron, a plurality of spherical stirring balls which are accommodated in the drying cauldron and a burner communicating with the lower portion of the incinerator for jetting flame toward the bottom surface of the drying cauldron.

According to the present invention, the raw sewage collected by the stool is once contained in the raw sewage tank and a given amount of the raw sewage is sucked by the pump and transferred to the drying cauldron. Since the drying cauldron is swingably held by the incinerator and the bottom surface thereof is always heated by flame current from the burner, the liquid component which is primary component of the raw sewage which flows into the drying cauldron is evaporated. In the drying process of the raw sewage, the drying cauldron is swung at an angular interval to the extent where the raw sewage is not scattered and is uniformly heated. At the same time, the stirring balls accommodated inside the cauldron stir and mix the raw sewage to thereby contribute to the increase of the temperature of the raw sewage. The liquid water evaporated from the raw sewage flows into the deodorizing unit together with the flame current of the burner and is involved in and rotated by the jetted air current which swirls at high speed in the deodorizing unit. Accordingly, the component causing the bad smell is oxidized and is changed to an odorless component while it is mixed with the high temperature air current at high speed and it is finally diffused into the atmosphere.

When the drying process is completed in the drying cauldron, the drying cauldron starts to rotate in a given direction to thereby remove the dust which is not evaporated therein. That is, when the drying cauldron starts to rotate, the stirring balls accommodated in the drying cauldron contact and rotate along the inner peripheral surface of the drying cauldron so that the dust stuck to the inner peripheral surface is peeled off by the stirring balls and drops outside the drying cauldron through the introduction port. Accordingly, since the dust accumulates on the lower portion of the incinerator and the inside of the drying cauldron is cleaned, it is standby for the next drying process. With a repetition of the cycle of these processes, a large amount of raw sewage can be successively dried.

DETAILED DESCRIPTION

Figure 1:
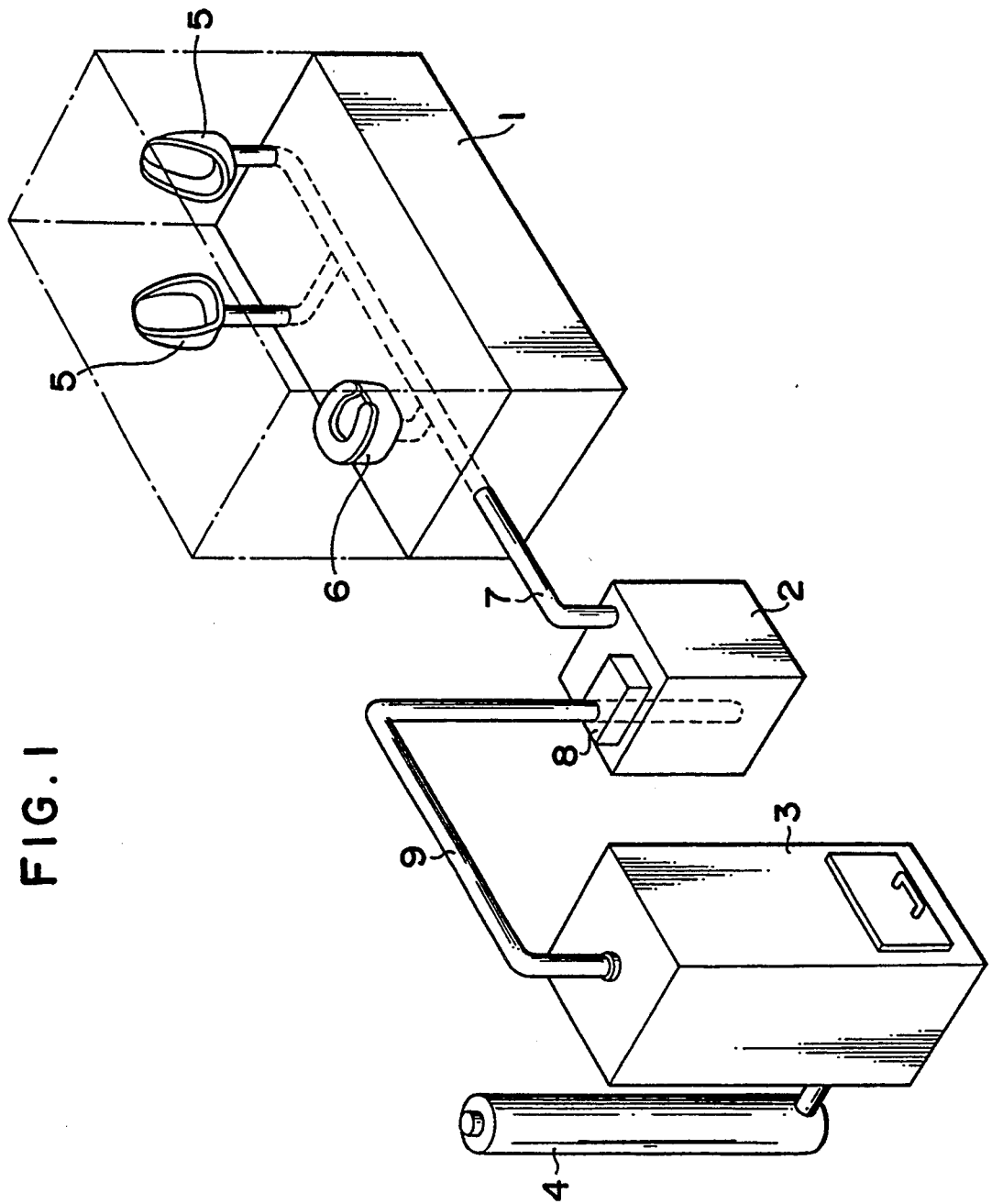
FIG. 1 is a perspective view showing a disposal system of a temporary toilet using a raw sewage disposal apparatus according to a first embodiment of the present invention.

First to third embodiments of the invention will be described in accordance with examples which are applied to a temporary raw sewage disposal system of a batch disposal cycle for collecting a large amount of raw sewage discharged from a plurality of urinals and stools, containing the raw sewage temporarily in a tank and drying the raw sewage by a raw sewage disposal unit.

First Embodiment (FIGS. 1 to 6):

A raw sewage disposal apparatus according to a first embodiment of the invention will be described with reference to FIGS. 1 to 6.

The raw sewage disposal apparatus comprises mainly a toilet unit 1, a raw sewage tank 2 and a drying unit 3. This toilet unit 1, raw sewage tank 2 and drying unit 3 are independent of one another. The toilet unit 1, raw sewage tank 2 and drying unit 3 are stored at a storage site such as a warehouse and conveyed by a truck from the storage site to a use site where they are assembled and used by people. The toilet unit 1 has a housing structure so as to be shielded from outside by walls and a roof. People enter the toilet unit 1. The toilet unit 1 incudes a plurality of urinals 5 and stools 6. The toilet unit 1 is partitioned at the inner side thereof by partition panels, doors, etc. and the partitioned sections are independent of one another for providing privacy. A collecting pipe 7 is connected to the urinals 5 and stools 6 at the lower portions thereof for collecting raw sewage which is discharged therefrom. The raw sewage collected by the collecting pipe 7 flows by gravity into the raw sewage tank 2 connected to the distal end of the collecting pipe 7. The raw sewage tank 2 has an airtight box-shape and is hollow at the inside thereof. The raw sewage tank 2 can temporarily contain therein the raw sewage introduced from the collecting pipe 7. A pump 8 which is driven by an electric motor, etc. is provided on the upper portion of the raw sewage tank 2 and is connected at the discharge side thereof to a supply pipe 9 for permitting the raw sewage, which is sucked from the lower portion of the raw sewage tank 2, to flow into the drying unit 3. The distal end of the supply pipe 9 is connected to the upper portion of the drying unit 3. A deodorizing unit 4 is connected to the rear surface of the drying unit 3 for dispersing liquid water generated therein to the atmosphere and removing bad smell generated when the raw sewage is evaporated.

Figure 2:
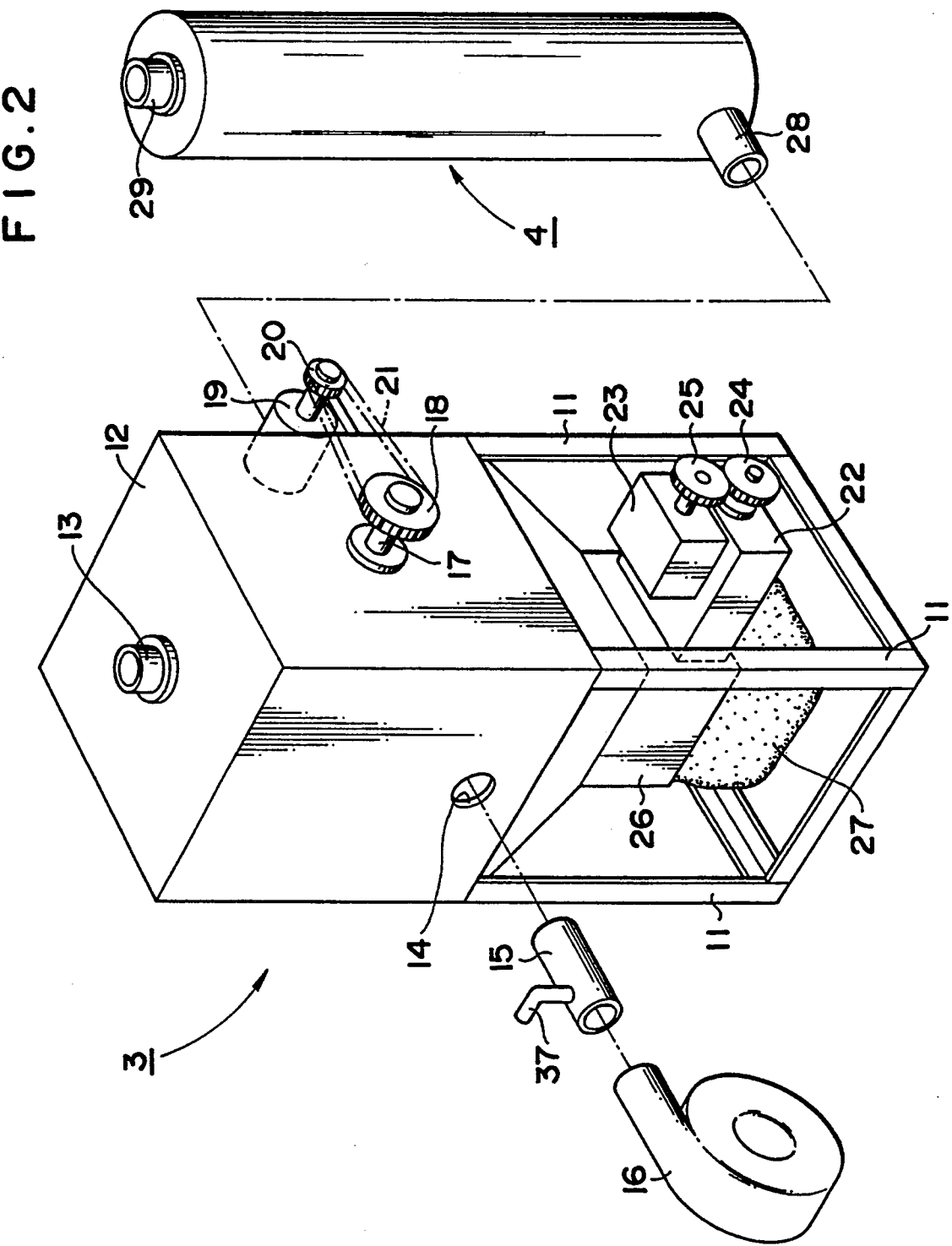
FIG. 2 is an exploded perspective view of the raw sewage disposal apparatus of FIG. 1 in which an outer cover thereof is removed.

FIG. 2 shows the inner structure of the drying unit 3 in which a cover attached thereto is removed. The drying unit 3 is covered by a cover (not shown) formed of thin metal plate, etc. for preventing parts thereof from being exposed outside and has a mechanism which is incorporated therein for continuously drying the raw sewage.

The drying unit 3 has four legs 11 at the four corners thereof which rise perpendicular relative to the ground and an incinerator 12 having a box-shape which is placed on the upper end of the legs 11 whereby the incinerator 12 is held by the legs 11 at a level higher than the ground. An introduction pipe 13 is fixed to the central upper surface of the incinerator 12 for communicating with the inside of the incinerator 12 and a hot blast discharge port 14 is defined at a lower portion of one side surface of the incinerator 12. A burner 15 is engaged in the hot blast discharge port 14 at one end thereof and is connected to a blower 16 for blowing air at the other end thereof. A fuel pipe 37 is connected to the side surface of the burner 15 for supplying fuel such as kerosene or heavy oil so as to generate hot air by burning such fuel.

A swing shaft 17 is inserted into the incineration so as to horizontally penetrate a second side surface of the incinerator 12. The swing shaft 17 is rotatably supported at opposite ends by the opposed sidewalls of the incinerator 12, and a sprocket 18 is fixed to the distal end of the swing shaft 17. A motor 19 provided at a third side surface and the motor shaft has a sprocket 20 fixed thereto. A chain or belt 21 is entrained around the sprockets 18 and 20. The incinerator 12 is throttled at the lower portion thereof in the manner that four corners thereof are inclined inward, thereby forming a frustoconical descent portion 26 which is tapered in descending direction. A closing operator portion 22 is connected to one side surface of the descent portion 26. A motor 23 is mounted on the upper surface of the closing operator portion 22. A gear 24 which is supported by the sidewall of the closing operator portion 22 meshes with a gear 25 fixed to the output shaft of the motor 23. A collection bag 27 formed of vinyl, paper, etc., is detachably connected to the lower portion of the descent portion 26 for collecting dust such as ash and fibrous substances which are not evaporated from the raw sewage but remains attached to the inner peripheral surface of the drying cauldron 31.

The deodorizing unit 4 is cylindrical and hollow at the inside thereof and is connected to a connection pipe 28 for connecting to the third side surface of the incinerator 12 at the lower side thereof. The deodorizing unit 4 communicates with the inside of the incinerator 12 by the connection pipe 28 so that air current flows therebetween. A discharge pipe 29 is defined at the upper portion of the deodorizing unit 4 for dispersing hot air into the atmosphere.

Figure 3:
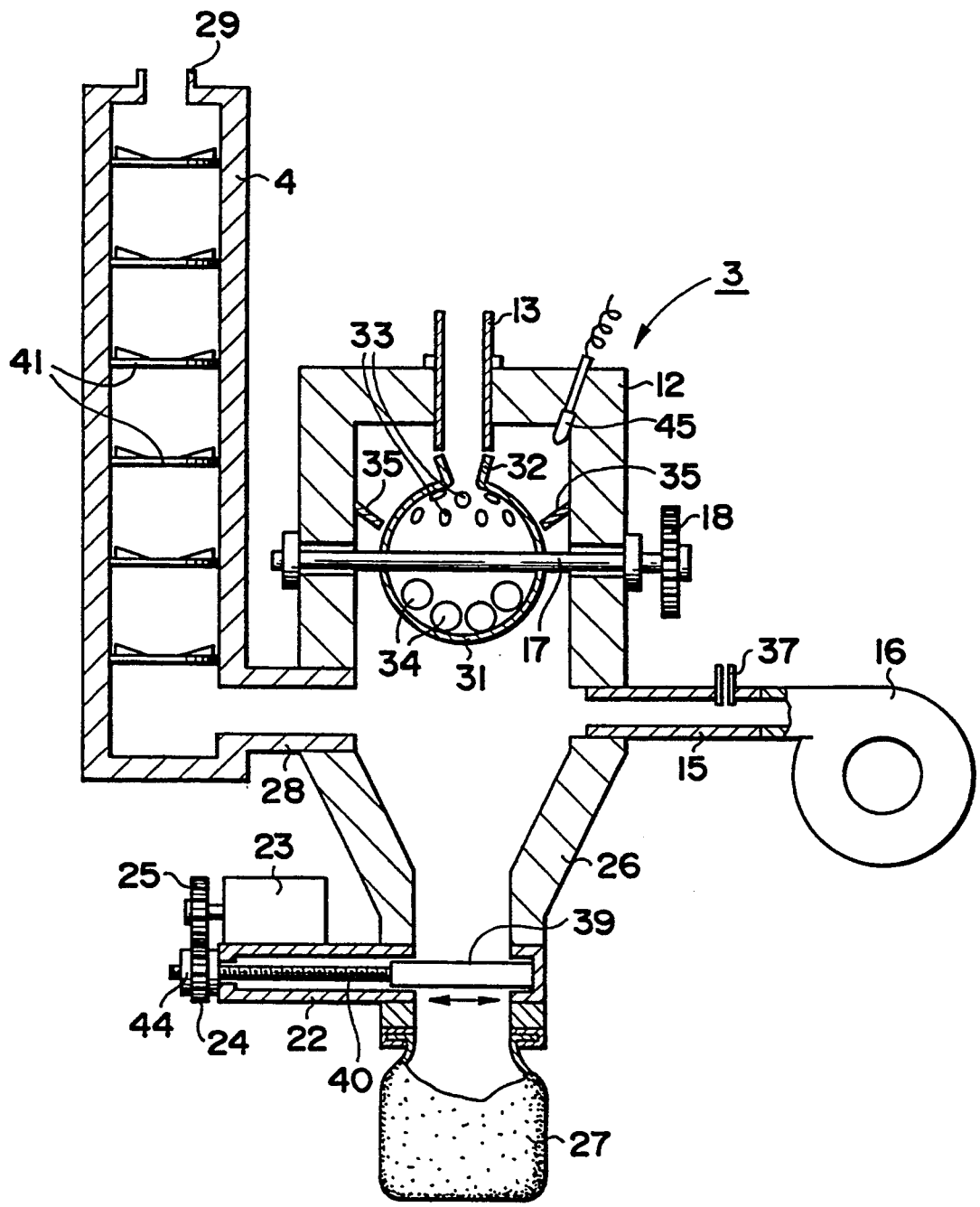
FIG. 3 is a longitudinal cross-sectional view showing an inner structure of the raw sewage disposal apparatus of FIG. 1.

FIG. 3 shows internal structures of the incinerator 12 and deodorizing unit 4. The drying unit 3 and deodorizing unit 4 are surrounded by insulating fire bricks or glass wool or the like at the inner surfaces thereof so that the heat is not transmitted to the outside but kept inside thereof for preventing the heat from being diffused uselessly. In FIGS. 2 and 3, the swing shaft 17 is illustrated in a position wherein it is displaced 90° horizontally relative to other units for convenience in ease of explanation as to the relation between the swing shaft 17 and other units.

The incinerator 12 is hollow at the inside thereof and surrounded by an insulating material. The swing shaft 17 is rotatably inserted into the incinerator 12 so as to be positioned horizontally at substantially the center of the inner space of the incinerator 12. A hollow spherical drying cauldron 31 is fixed to the center of the swing shaft 17 and is open at the peripheral upper portion thereof to form an introduction port 32 which communicates with the interior of the cauldron. The drying cauldron 31 has a plurality of ventilation perforations 33 which are defined around the introduction port 32 for communicating with the inner and outer peripheral surfaces thereof. A plurality of spherical stirring balls 34, each having a diameter which is greater than the inner diameters of the introduction port 32 and ventilation perforations 33, are accommodated inside the drying cauldron 31. Shielding plates 35 are fixed to the inner wall of the incinerator 12 at a position above the swing shaft 17 and have distal ends which extend out from the inner wall of the incinerator 12 to a position so as to not contact the outer peripheral surface of the drying cauldron 31. The shielding plates 35 serve as baffle plates for preventing ascending flame from entering into the upper portion of the incinerator 12. The introduction pipe 13 is mounted on the upper central portion of the incinerator 12 so as to be positioned substantially perpendicular to the incinerator 12 at the axis thereof and it aligns with the opening of the introduction port 32 at the open lower end thereof. A temperature sensor 45 is provided at the inner upper surface of the incinerator 12 for detecting change of temperature.

The closing operator portion 22 is connected to the lower portion of the descent portion 26. A flat plate-shape shutter or valve 39, which is movable horizontally, is provided inside the operator portion 22. A discharge opening at the lower end of the descent portion 26 is openable and closable by movement of the shutter 39. An operation screw 40 which is threaded at its entire length is connected to one end of the shutter 39. A female screw body 44 is screwed onto the operation screw 40 and is fixed to the gear 24 at the outer periphery thereof. Accordingly, when the gear 24 is driven by the gear 25, the female screw body 44 is turned to thereby move forward and backward the operation screw 40 in the horizontal direction. The collection bag 27 is detachably attached to the lower opening of the closing operator portion 22 wherein the latter is closed by the former.

Insulating bricks, glass wool or the like is fixed to the inner peripheral wall of the deodorizing unit 4 so as to insulate the deodorizing unit 4 from the outside. A connection pipe 28 is connected to the lower side surface of the deodorizing unit 4 so as to communicate with the inside space of the deodorizing unit 4. The inner space of the incinerator 12 communicates with that of the deodorizing unit 4. A discharge pipe 29 is connected to the upper central portion of the deodorizing unit 4 so as to communicate with the inner space of the deodorizing unit 4. Hot exhaust gases from the incinerator 12 pass through the deodorizing unit 4 and are diffused outside by the discharge pipe 29. A plurality of thin plate-shaped rectifier plates 41 are fixed to the inner wall of the deodorizing unit 4 at appropriate vertical intervals. Each of the rectifier plate 41 is disk-shaped and is formed of a heat-resistant material such as stainless steel.

Figure 4:
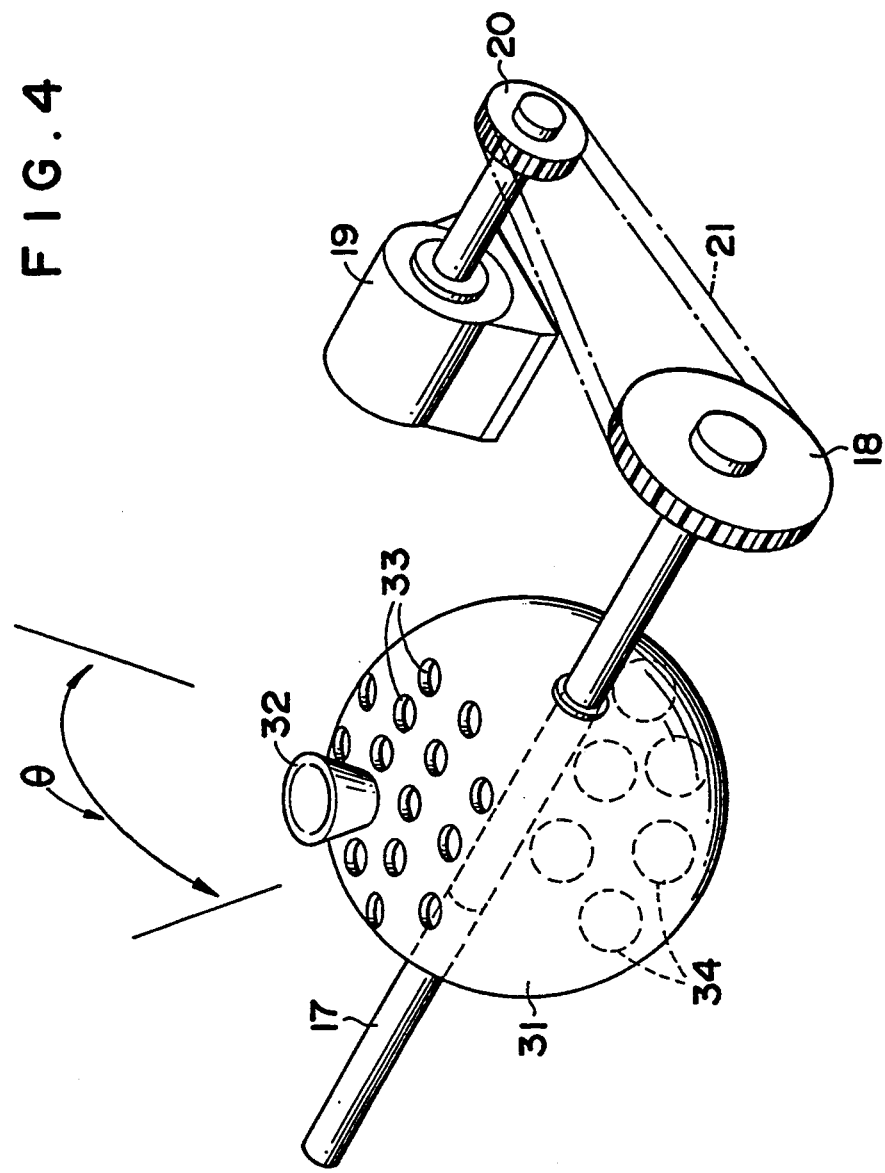
FIG. 4 is a view showing the shape of a drying cauldron of the raw sewage disposal apparatus of FIG. 1.

FIG. 4 shows the drying cauldron 31 and a driving mechanism. The drying cauldron 31 is formed of a material such as iron, etc., in a hollow spherical shape and the introduction pipe 13 aligns with the center thereof in the vertical direction. The drying cauldron 31 is supported by the shaft 17.

Figure 5:
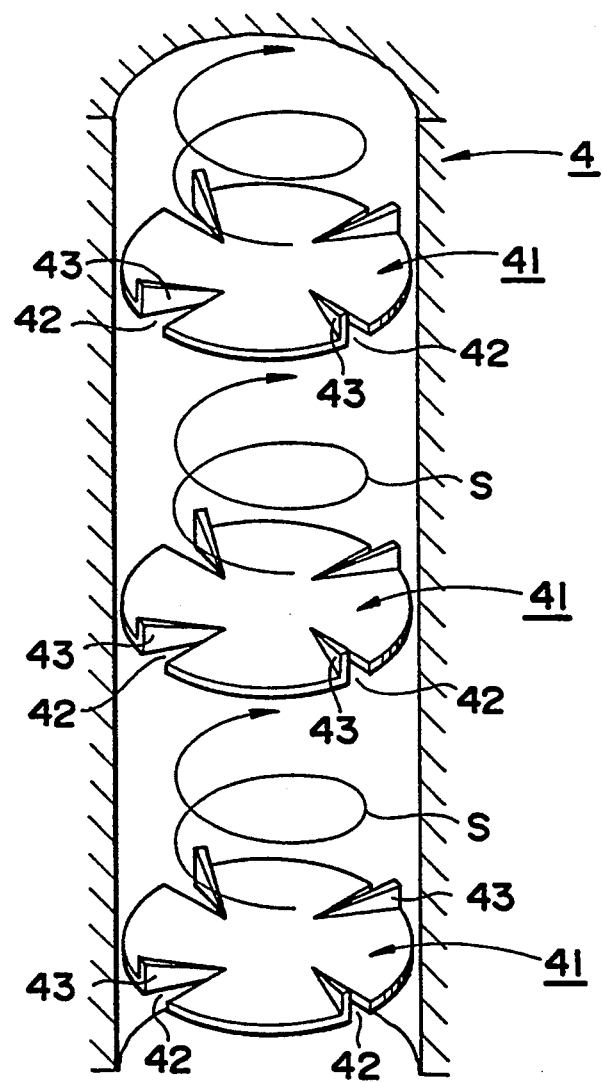
FIG. 5 is a view showing the inner arrangement of a deodorizing unit employed by the raw sewage disposal apparatus of FIG. 1.
Figure 6:
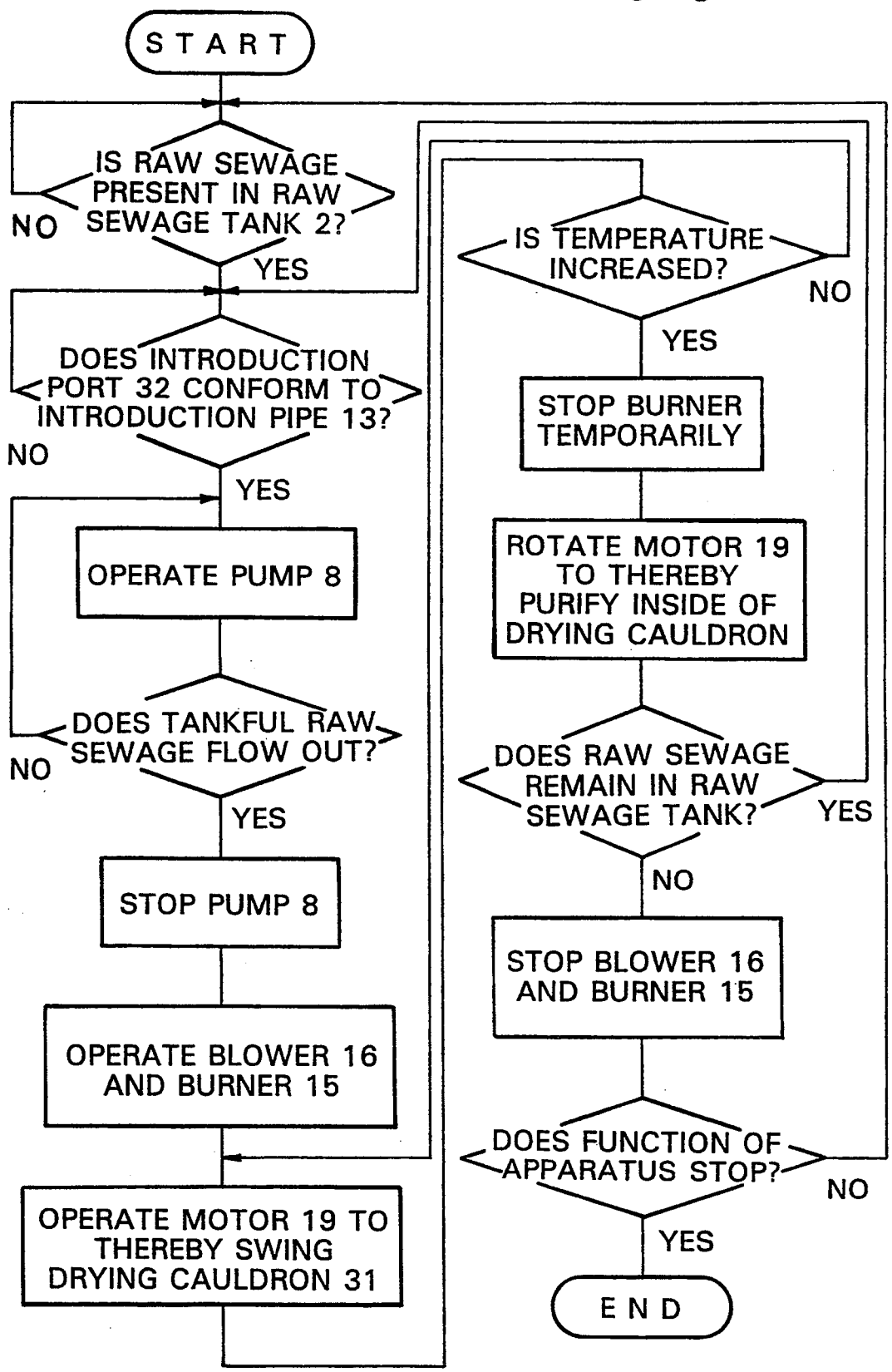
FIG. 6 is a flow chart showing a series of operations of the raw sewage disposal apparatus of FIG. 1.

FIG. 5 shows detailed shapes of the rectifier plates 41 which are fixed to the deodorizing unit 4. Each of the rectifier plates 41 is formed of a steel or stainless steel plate. Each rectifier plate 41 is cut from the periphery thereof toward the center thereof to form a plurality of notches 42. One side of each notch rises and directs upward so as to be inclined or tapered from the peripheral portion to the central portion to form a fin 43. As a result, each rectifier plate 41 is machined like a petal by the provision of the notch 42 as if it had an inclination angle.

The operation of the raw sewage disposal apparatus is described hereinafter.

A user enters the toilet unit 1 and uses the urinal 5 or stool 6 from which raw sewage is discharged and collected by the collection pipe 7 and then contained temporarily in the raw sewage tank 2. When the raw sewage is contained temporarily in the raw sewage tank 2, the presence of the raw sewage is detected by a sensor (not shown). If the presence of the raw sewage is detected by the sensor, a drying process starts.

The raw sewage contained in the raw sewage tank 2 is sucked by the pump 8 and is transferred under pressure to the incinerator 12 by way of the supply pipe 9. The raw sewage passes through the supply pipe 9 and the introduction pipe 13 and is introduced into the drying cauldron 31 through the port 32. A stopping position of the swing shaft 17 is set beforehand by a limit switch, etc., before the pump 8 operates. The introduction pipe 13 aligns with the introduction port 32 at the same position where the raw sewage is introduced in the drying cauldron 31 by way of the introduction port 32. Operation time for supplying the raw sewage under pressure by the pump 8 into the drying cauldron 31 is set to a given time and the amount of supply of the raw sewage is set not to exceed one-half of the inside volume of the drying cauldron 31. In such a manner, a batch of raw sewage is supplied to the drying cauldron 31. Thereafter, the pump 8 does not operate until the completion of the entire drying process of the raw sewage so that the raw sewage is not sucked from the raw sewage tank 2 by the pump 8. Accordingly, the raw sewage collected by the urinals 5 and stools 6 are successively contained in the raw sewage tank 2 until the next drying process starts.

Almost simultaneously with the transfer of the raw sewage from the raw sewage tank 2 by the pump 8, the incinerator 12 is heated in the following manner. That is, the burner 15 and the blower 16 start to operate so that fresh air is supplied by the blower 16 to the burner 15 while fuel is supplied from the fuel pipe 37 to the burner 15 where to thereby generate heat. The generated heat is mixed with air from the blower 16 and changed into hot air or hot blast. The hot blast is jetted by the burner 15 and enters the incinerator 12 by way of the hot blast discharge port 14. The hot blast contacts the exterior bottom surface of the drying cauldron 31 to thereby heat the drying cauldron 31 so that the raw sewage contained in the drying cauldron 31 is heated. At the same time, the hot blast from the burner 15 heats the entire incinerator 12 and then passes through the incinerator 12 and enters the deodorizing unit 4 by way of the connection pipe 28. The hot blast passes the notches 42 of the rectifier plates 41 and ascends upward along each stage of the rectifier plates 41 and is finally discharged from the discharge pipe 29 and diffused into the atmosphere.

When a given amount of raw sewage is contained inside the drying cauldron 31, the operation of the pump 8 stops and successively the motor 19 starts to thereby rotate the sprocket 20 upon confirmation of the completion of the operation of the pump 8. Accordingly, the sprocket 20 drives the chain 21, sprocket 18 and the swing shaft 17 so that the drying cauldron 31 starts to swing. At the start of the drying process, the motor 19 moves reciprocally through a given set angular interval, namely, the swing shaft 17 and the drying cauldron 31 swing forward and backward about the axis of the swing shaft 17 within the angular interval $\theta$ (FIG. 4) while the introduction port 32 is maintained in an upward position. That is, the drying cauldron 31 swings reciprocally like the motion of a pendulum within the extent that the raw sewage contained therein does not scatter or discharge out the openings 32 and 33. Since the burner 15 heats the bottom surface of the drying cauldron 31 containing the raw sewage, the temperature of the raw sewage in the drying cauldron 31 increases so that the liquid component which is a primary component of the raw sewage is evaporated to form water vapor which is dispersed through the ventilation perforation 33. In the evaporation process, the raw sewage is swung in the drying cauldron 31 and is uniformly heated since the drying cauldron 31 is swung forward and backward through the angular interval $\theta$. At the same time, the stirring balls 34 in the drying cauldron 31 move on the inner peripheral surface of the drying cauldron 31 so that the stirring balls 34 stir the raw sewage. As a result, the temperature of the raw sewage is made uniform and heat accumulated in the stirring balls 34 is transmitted to the raw sewage so that the increase of the temperature of the raw sewage in the drying cauldron 31 is accelerated.

In such a manner, the bottom surface of the drying cauldron 31 is heated by the hot blast jetted from the burner 15 and the vaporized liquid component of the raw sewage contained in the drying cauldron 31 flows into the incinerator 12 by way of the introduction port 32 and ventilation perforations 33, and then vaporized the water flows along with the hot blast current from the burner 15 and passes into the connection pipe 28 and successively moves through the inside of the deodorizing unit 4. The liquid water evaporated in the drying cauldron 31 contains volatile components such as urea, ammonia, etc. contained in the raw sewage and cause a bad smell if they are diffused into the atmosphere. Accordingly, the hot blast containing the vaporized water of the raw sewage which passed the connection pipe 28 enters the deodorizing unit 4 and rises sequentially in ascending order from the notches 42 toward upper stages of rooms defined by the rectifier plates 41 as illustrated in FIG. 5. Since fins 43 are provided aslant on the rectifier plates 41, the hot blast including the vaporized water is jetted aslant (i.e. swirled) because of the inclination angle of the fins 43 when it flows upward in the deodorizing unit 4 through the rectifier plates 41 so that it turns and swirls between the rectifier plates 41 as denoted at arrow S in FIG. 5 while it rises. Since the air in the deodorizing unit 4 is the hot blast caused by the flame jetted from the burner 15, it remains hot between the rectifier plates 41 of the deodorizing unit 4 whereby it turns and swirls as denoted at S while the bad smell component such as urea, ammonia, etc. contained in the vaporized water is oxidized by high temperature heat and is changed into an odorless component. In such a manner it rises sequentially of unit 4 from the rectifier plates 41 of the lower stage to the rectifier plate 41 of the upper stage while the bad smell component contained in the vaporized water is burnt and changed into a warm air current containing an odorless component and is finally diffused outside the apparatus. Consequently, the liquid component which is the primary component of the raw sewage contained in the drying cauldron 31 is changed into odorless vaporized water and is diffused into the atmosphere.

Successively, when the drying cauldron 31 is heated for a given time by the hot blast from the burner 15, all the liquid component of the raw sewage contained therein is evaporated. In such a state, the temperature of the drying cauldron 31 increases and the drying process is completed. That is, the temperature sensor 45 detects the increase of the temperature of the drying cauldron 31 and judges that all the liquid component of the sewage is evaporated. A cleaning process of the drying cauldron 31 follows after this judgment is performed by the temperature sensor 45.

In the cleaning process, the motor 19 does not perform swing motion in a given angular interval θ as in the drying process, but rather starts a normal continuous rotary motion to thereby rotate the drying cauldron 31 about the axis of shaft 17 by way of the sprocket 20, chain 21 and the sprocket 18. Since the drying cauldron 31 accommodating the stirring balls 34 therein rotates in one direction, the stirring balls 34 move along the inner peripheral surface of the drying cauldron 31 whereby the dust such as fibrous substances, etc., which is not evaporated from the raw sewage but remains attached to the inner peripheral surface of the drying cauldron 31, is cut out or loosened by the stirring balls 34. The dust drops toward the lower portion of the incinerator 12 through the ventilation perforations 33. The dust attached to the outer periphery of the stirring balls 34 is also loosened by the stirring balls 34 when the stirring balls 34 contact one another. Since the diameter of the stirring ball 34 is greater than the inner diameters of the ventilation perforation 33 and the introduction port 32, the stirring balls 34 do not drop outside through the ventilation perforations 33 and introduction port 32, but the dust alone drops through the introduction port 32 and ventilation perforations 33.

A sensor (not shown) detects if raw sewage remains in the raw sewage tank 2. If raw sewage remains, the pump 8 sucks the raw sewage in the same manner as described above and the remaining raw sewage is subjected to the drying process as described above. If the sensor detects that raw sewage does not remain in the raw sewage tank 2 after repetitive performance of the drying process, the operation of the raw sewage disposal apparatus is stopped temporarily. Accordingly, the operations of the burner 15 and blower 16 are stopped and the raw sewage disposal apparatus is in standby until the raw sewage collected by the urinal 5 and stool 6 and contained in the raw sewage tank 2 is sufficient so as to be subjected to the drying process. Meanwhile, after the raw sewage in the raw sewage tank 2 is entirely subjected to the drying process, all the functions of the raw sewage disposal apparatus can be stopped by, for example, cutting off the driving power source and remaining stopped until the next operation.

Ash dropped into the incinerator 12 through the introduction port 32 and ventilation perforations 33 is guided by the descent portion 26 which is throttled at the lower portion of the incinerator 12 and successively accumulates on the upper surface of the shutter 39. Although not much ash is produced by drying a tankful of raw sewage in the drying cauldron 31, some ash accumulates on the upper surface of the shutter 39. The ash accumulated on the shutter 39 must be removed and discharged outside the apparatus at an appropriate time to continue the drying process for a long period of continuous use of the raw sewage disposal apparatus. To remove the ash, the motor 23 is driven to rotate the gears 24 and 25 to thereby move the operation screw screwed into the female screw body 44 in one direction. When the operation screw 40 moves in one direction, the shutter 39 is driven by the operation screw 40 and moves horizontally in the closing operator portion 22 to thereby open the descent portion 26 at its lower portion so that the descent portion 26 communicates with the collection bag 27. Accordingly, the ash accumulated on the upper surface of the shutter 39 drops into and is collected by the collection bag 27. After the descent portion 26 is opened at its lower opening by the movement of the shutter 39 for a given time, the motor 23 is reversely rotated to thereby move the operation screw 40 in the opposite direction by the female screw body 44. As a result, the descent portion 26 is closed by the shutter 39 and stands by for the next drying process. The collection bag 27 is detached from the lower portion of the closing operator portion 22 and the opening of the collection bag 27 is tied with a string so that the collection bag 27 can be collected as a dust pack.

The raw sewage contained in the raw sewage tank 2 can be continuously dried by a continuous cycle of drying, deodorizing, ash cleaning and ash collecting. If the sensor detects that the raw sewage tank 2 is empty after all the raw sewage in the raw sewage tank 2 is dried by given times of cycles, the operation of the pump 8 and all the operations of the drying unit 3 are stopped, whereby the raw sewage disposal apparatus is held in stand by until the next collection of raw sewage. The series of process steps are illustrated in the flow chart of FIG. 6.

Figure 7:
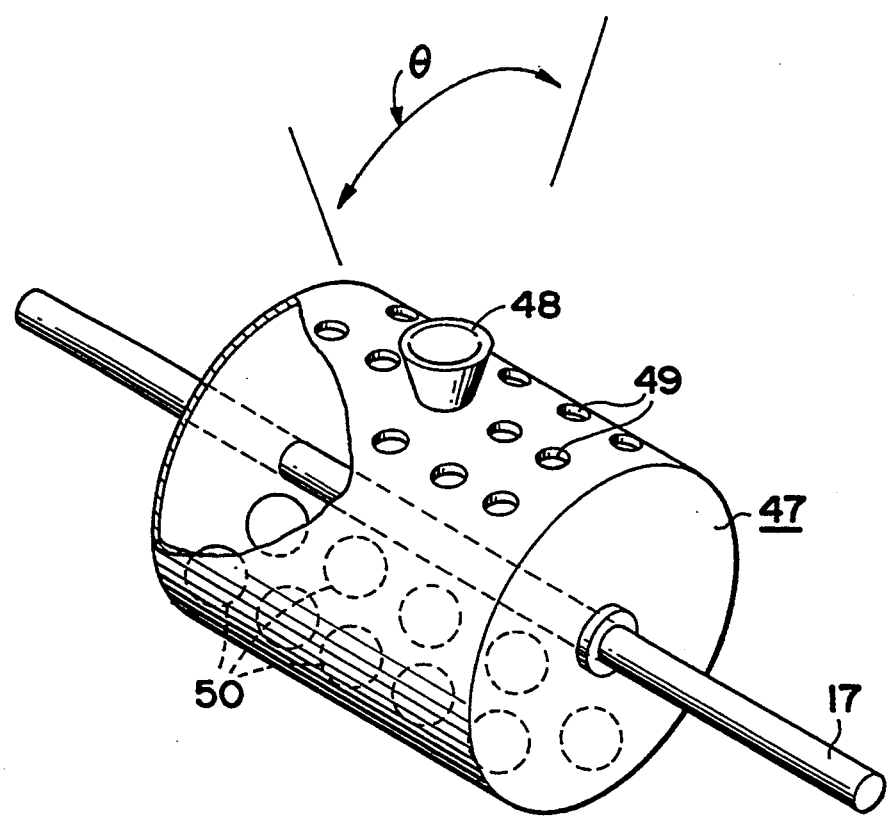
FIG. 7 is a perspective view of a drying cauldron of a raw sewage disposal apparatus according to a second embodiment of the present invention.

Second Embodiment (FIG. 7):

FIG. 7 shows a drying cauldron 47 according to a second embodiment of the invention. The drying cauldron 47 has a cylindrical peripheral sidewall and has paralleled disk-shaped end walls and is hollow at the inside thereof. The swing shaft 17 is coaxially aligned with the axis of cauldron 47 and penetrates both the disk-shaped end walls and is fixed thereto.

An introduction port 48 is defined at the upper center of the peripheral sidewall of the drying cauldron 47 so as to communicate with the interior of the drying cauldron 47. A plurality of ventilation perforations 49 are defined through the peripheral sidewall of the drying cauldron 47 adjacent to the introduction port 48. A plurality of spherical stirring balls 50, each having diameter which is greater than inner diameters of the introduction port 48 and ventilation perforation 49, are accommodated inside the drying cauldron 47.

According to this second embodiment, the raw sewage is introduced into the drying cauldron 47 like the drying cauldron 31 of the first embodiment from the introduction port 48 and the drying cauldron 47 is heated by permitting the current of flame to contact the lower surface of the drying cauldron 47 so as to evaporate the raw sewage contained in the drying cauldron 47. When heating the drying cauldron 47, the drying cauldron 47 is swung back-and-forth at the angular interval θ by the rotation of the swing shaft 17 so as to stir the raw sewage in the drying cauldron 47. Accordingly, the raw sewage in the drying cauldron 47 swings together with the stirring balls 50 and the temperature of the raw sewage is increased so as to be uniform so that the liquid component which is a primary component of the raw sewage is evaporated. The water thus evaporated in the drying cauldron 47 flows out from the introduction port 48 and ventilation perforations 49 so that the raw sewage is successively dried. After the liquid component of the raw sewage is evaporated by heating of the drying cauldron 47 for a prescribed time, then the drying cauldron 47 is rotated in a given direction so that the dust such as ash which is stuck to the inner wall of the drying cauldron 47 is peeled off by the stirring balls 50. Thereafter, the cleaning process starts. The powdered ash falls downward through the introduction port 48 and ventilation perforations 49 during rotation of the cauldron, and the cauldron is cleaned for the next evaporation process. In such a way, the evaporation of the raw sewage and the cleaning of the ash can be performed in the drying cauldron 47.

Figure 8:
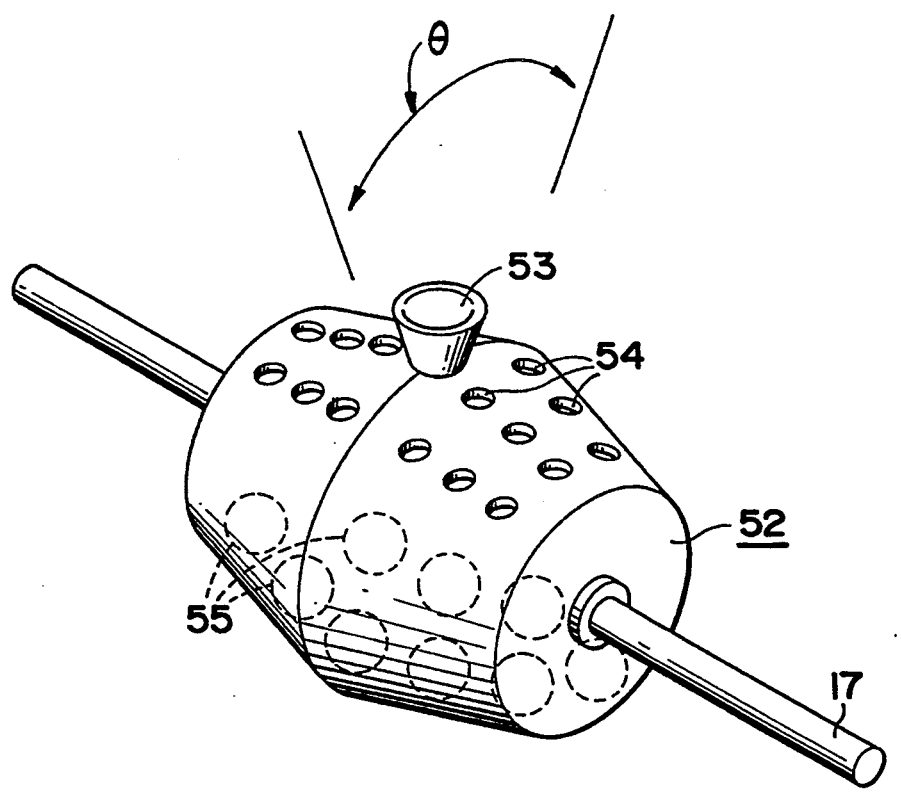
FIG. 8 is a perspective view of a drying cauldron of a raw sewage disposal apparatus according to a third embodiment of the present invention.

Third Embodiment (FIG. 8):

FIG. 8 shows a drying cauldron 52 according to a third embodiment of the invention. The drying cauldron 52 has disk-shaped end wall sides to which substantially frustoconical peripheral wall members are connected, with the large diameter ends thereof fixedly joining each other. Accordingly, the outer shape of the drying cauldron 52 is like a bead in which the outer diameter of the drying cauldron 52 is a maximum at the center thereof and reduces or tapers toward both axial ends thereof. An introduction port 53 is provided at the central outer peripheral wall of the drying cauldron 52 so as to communicate with the interior of the drying cauldron 52. A plurality of ventilating perforations 54 are defined through the peripheral wall of the drying cauldron 52 around the introduction port 53 so as to communicate with the inner and outer peripheral surfaces of the drying cauldron 52. A plurality of stirring balls 55 formed of ceramic, metal, etc., are accommodated in the drying cauldron 52. The outer diameter of each stirring ball 55 is greater than the inner diameters of the introduction port 53 and ventilating perforation 54.

In the drying cauldron 52 of the third embodiment, the raw sewage is introduced inside the drying cauldron 52 from the introduction port 53 like the first and second embodiments and it can be dried by heating the drying cauldron 52. In the drying process, the drying cauldron 52 is swung back-and-forth at the angular interval θ by the swing shaft 17 and the raw sewage is stirred by the stirring balls 55 so as to be uniform in the temperature thereof and is expedited in its evaporation. The liquid water evaporated from the raw sewage flows out through the introduction port 53 and ventilating perforations 54. When the raw sewage is dried after completion of the given drying time, the swing shaft 17 is rotated in a given direction to thereby rotate the cauldron causing the stirring balls 55 to move along the inner periphery of the drying cauldron 52 so that the ash stuck to the inner periphery of the drying cauldron 52 is peeled off. Thereafter, the cleaning process starts. The ash which is powdered in the cleaning process drops downward through the introduction port 53 and ventilating perforations 54.

With the arrangement of the invention as set forth above, the raw sewage contained in the drying cauldron can be evaporated although the structure of the apparatus is simple. Since the drying cauldron is heated by the current of flame of high temperature, the temperature of the drying cauldron is quickly increased to thereby expedite the evaporation. Furthermore, the stirring balls accommodated in the drying cauldron can stir and peel off the dust such as ash which is stuck to the inner periphery of the drying cauldron upon completion of the drying process, whereby the cleaning process is performed. The bad smell component which is generated by the drying process is oxidized and odorless and diffused outside the cauldron while it swirls together with hot blast in the deodorizing unit. As a result, the raw sewage disposal apparatus does not generate a bad smell even if it is used at a place near a densely-populated area. In such a manner, a large amount of the raw sewage can be processed continuously by the drying cauldron with repetitive cycles of the drying and cleaning processes. Accordingly, the raw sewage disposal apparatus of the present invention is adapted for disposal of raw sewage in a temporary toilet which is used by many people in a short period of time.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A raw sewage disposal apparatus comprising:
   an incinerator shielded from the outside;
   a swing shaft horizontally rotatably supported on said incinerator;
   a hollow drying cauldron fixed to said swing shaft and disposed within the incinerator;
   an introduction port defined in a peripheral wall of said drying cauldron for introducing raw sewage into said drying cauldron;
   a plurality of spherical stirring balls accommodated in said drying cauldron; and
   a burner communicating with a lower portion of said incinerator for jetting a flame toward a bottom surface of said drying cauldron.

2. A raw sewage disposal apparatus according to claim 1 further comprising a plurality of ventilation perforations defined through the peripheral wall of said drying cauldron adjacent to said introduction port.

3. A raw sewage disposal apparatus according to claim 1, wherein a drive means swings said swing shaft through a predetermined back-and-forth angular interval during a drying process while maintaining said introduction port directed generally upwardly, and said drive means rotates said swing shaft in a given rotational direction during a cleaning process upon completion of the drying process.

4. A raw sewage disposal apparatus according to claim 1 further comprising an introduction pipe which is defined on an upper portion of said incinerator at a position confronting said introduction port of said drying cauldron for introducing raw sewage into said drying cauldron.

5. A raw sewage disposal apparatus according to claim 1, wherein said drying cauldron is spherical and is hollow at the inside thereof.

6. A raw sewage disposal apparatus according to claim 1, wherein said drying cauldron is cylindrical and is hollow at the inside thereof.

7. A raw sewage disposal apparatus according to claim 1, wherein said drying cauldron is hollow at the inside thereof and has a generally cylindrical configuration, a diameter of which is largest at a central portion and smaller at right and left sides thereof and which gradually reduces toward right and left sides thereof.

8. A raw sewage disposal apparatus comprising:
an incinerator shielded from the outside;
a swing shaft horizontally rotatably supported on said incinerator;
a hollow drying cauldron fixed to said swing shaft and disposed within the incinerator;
an introduction port defined in a peripheral wall of said drying cauldron for introducing raw sewage into said drying cauldron;
a plurality of spherical stirring balls accommodated in said drying cauldron;
a burner communicating with a lower portion of said incinerator for jetting a flame toward the bottom surface of said drying cauldron; and
a deodorizing unit communicating with said incinerator for changing air in said incinerator into odorless air and diffusing the odorless air into the atmosphere.

9. A raw sewage disposal apparatus according to claim 8, wherein said deodorizing unit is disposed beside said incinerator and communicates with a side surface of said incinerator at a position confronting said burner.

10. A raw sewage disposal apparatus according to claim 8, wherein said deodorizing unit is hollow at an inside thereof and is positioned vertically along its axis and has a plurality of rectifier plates fixed to an inner wall surface thereof at predetermined vertical interval for creating a swirling air current.

11. A raw sewage disposal apparatus according to claim 8, wherein said drying cauldron is spherical and is hollow at the inside thereof.

12. A raw sewage disposal apparatus according to claim 8, wherein said drying cauldron is cylindrical and is hollow at the inside thereof.

13. A raw sewage disposal apparatus according to claim 8, wherein said drying cauldron is hollow at the inside thereof and has a generally cylindrical configuration, a diameter of which is largest at a central portion and smaller at right and left sides thereof and which gradually reduces toward right and left sides thereof.

14. A raw sewage disposal apparatus comprising:
an incinerator shielded from the outside;
a swing shaft horizontally rotatably supported on said incinerator;
a hollow drying cauldron fixed to said swing shaft and disposed within the incinerator;
an introduction port defined in a peripheral wall of said drying cauldron for introducing raw sewage into said drying cauldron;
a plurality of spherical stirring balls accommodated in said drying cauldron;
a burner communicating with a lower portion of said incinerator for jetting a flame toward a bottom surface of said drying cauldron; and
a shutter mechanism provided under said incinerator for permitting discharge of ash from inside the incinerator.

15. A raw sewage disposal apparatus according to claim 14 further comprising a collection bag disposed under and detachably connected to said shutter mechanism for collecting ash which remains after evaporation of the raw sewage in said drying cauldron.

16. A raw sewage disposal apparatus according to claim 14, wherein said drying cauldron is spherical and is hollow at the inside thereof.

17. A raw sewage disposal apparatus according to claim 14, wherein said drying cauldron is cylindrical and is hollow at the inside thereof.

18. A raw sewage disposal apparatus according to claim 14, wherein said drying cauldron is hollow at an inside thereof and has a generally cylindrical configuration, a diameter of which is largest at the central portion and smaller at right and left sides thereof and gradually reduced toward right and left sides thereof.

19. A raw sewage disposal apparatus according to claim 14, further comprising a deodorizing unit communicating with said incinerator for changing air in said incinerator into odorless air and diffusing the odorless air into the atmosphere.

* * * * *